(12) United States Patent
Hayashi

(10) Patent No.: US 8,885,450 B2
(45) Date of Patent: Nov. 11, 2014

(54) METHOD OF MANUFACTURING MASTER DISC, METHOD OF MANUFACTURING RECORDING MEDIUM, PROGRAM, AND RECORDING MEDIUM

(75) Inventor: Shinobu Hayashi, Shizouka (JP)

(73) Assignees: Sony Corporation, Tokyo (JP); Sony DADC Corporation, Tokyo (JP)

( * ) Notice: Subject to any disclaimer, the term of this patent is extended or adjusted under 35 U.S.C. 154(b) by 0 days.

(21) Appl. No.: 13/881,384

(22) PCT Filed: Nov. 7, 2011

(86) PCT No.: PCT/JP2011/075587
§ 371 (c)(1),
(2), (4) Date: Apr. 25, 2013

(87) PCT Pub. No.: WO2012/066958
PCT Pub. Date: May 24, 2012

(65) Prior Publication Data
US 2013/0215732 A1    Aug. 22, 2013

(30) Foreign Application Priority Data
Nov. 17, 2010    (JP) .................................. 2010-256453

(51) Int. Cl.
*G11B 7/00* (2006.01)
*G11B 7/007* (2006.01)
*G11B 20/12* (2006.01)
*G11B 7/26* (2006.01)

(52) U.S. Cl.
CPC ............... *G11B 7/007* (2013.01); *G11B 7/283* (2013.01); *G11B 7/00736* (2013.01); *G11B 2220/213* (2013.01); *G11B 20/1217* (2013.01); *G11B 2220/2537* (2013.01); *G11B 7/261* (2013.01)

USPC ..................................................... 369/124.07

(58) Field of Classification Search
None
See application file for complete search history.

(56) References Cited

U.S. PATENT DOCUMENTS

| 7,869,595 B2 * | 1/2011 | Furukawa et al. ............ 380/201 |
| 2006/0112284 A1 * | 5/2006 | Kato et al. .................... 713/193 |
| 2009/0245053 A1 * | 10/2009 | Onoda et al. ................. 369/53.2 |

(Continued)

FOREIGN PATENT DOCUMENTS

| JP | 2-56750 | 2/1990 |
| JP | 10-289486 | 10/1998 |

(Continued)

*Primary Examiner* — Brenda Bernardi
(74) *Attorney, Agent, or Firm* — Oblon, Spivak, McClelland, Maier & Neustadt, L.L.P.

(57) ABSTRACT

Information unique on a group basis is allowed to be efficiently added to a recording medium in which read-only contents data is recorded. Master data (cutting master) having a data structure in which data to be replaced is managed by a file system as data to be arranged in a specific folder or a specific file is produced by authoring. In manufacturing of a recording medium master disc through premastering and mastering using the master data, replacement data unique to each group is prepared, and the data to be replaced is replaced with the replacement data to perform the mastering (master disc exposure). Then, a stamper is produced from the produced master disc, and recording media is mass-produced by using the stamper. In other words, the replacement data are changed on the group basis to allow the recording media in which the replacement data (such as GP1 and GP2) unique to each group is recorded as read-only data to be manufactured, as recording media containing the same content.

17 Claims, 14 Drawing Sheets

(56) References Cited

U.S. PATENT DOCUMENTS

| | | | |
|---|---|---|---|
| 2010/0050250 A1* | 2/2010 | Ueda et al. | 726/17 |
| 2010/0084785 A1* | 4/2010 | Masuhara et al. | 264/220 |
| 2010/0118675 A1* | 5/2010 | Nakano et al. | 369/53.21 |
| 2010/0260020 A1* | 10/2010 | Uchimura et al. | 369/47.15 |
| 2010/0275164 A1* | 10/2010 | Morikawa | 715/838 |
| 2013/0142028 A1* | 6/2013 | Kashiwagi et al. | 369/272.1 |

FOREIGN PATENT DOCUMENTS

| | | |
|---|---|---|
| JP | 2006-203812 | 8/2006 |
| JP | 2010-86636 | 4/2010 |
| JP | 2010-257509 | 11/2010 |

* cited by examiner

FIG. 14 index.bdmv - Syntax

| Syntax | No. of bits |
|---|---|
| index.bdmv { | |
|   type_indicator | 8*4 |
|   version_number | 8*4 |
|   Indexes_start_address | 32 |
|   ExtensionData_start_address | 32 |
|   GP_info | 128 |
|   reserved_for_future_use | 64 |
|   AppInfoBDMV() | |
|   for(i=0; i<N1; i++){ | |
|     padding_word | 16 |
|   } | |
|   Indexes() | |
|   for(i=0; i<N2; i++){ | |
|     padding_word | 16 |
|   } | |
|   ExtensionData() | |
|   for(i=0; i<N3; i++){ | |
|     padding_word | 16 |
|   } | |
| } | |

91

METHOD OF MANUFACTURING MASTER DISC, METHOD OF MANUFACTURING RECORDING MEDIUM, PROGRAM, AND RECORDING MEDIUM

TECHNICAL FIELD

The present disclosure relates to a method of manufacturing a master disc, a method of manufacturing a recording medium, and a program that are applicable to manufacturing of an optical disc and the like, and to a recording medium such as an optical disc.

CITATION LIST

Patent Literature

PTL 1: Japanese Unexamined Patent Application Publication No. H2-56750
PTL 2: Japanese Unexamined Patent Application Publication No. H10-289486

BACKGROUND ART

As an optical disc, BD (Blu-ray Disc (registered trademark)), DVD (Digital Versatile Disc), CD (Compact Disc), and the like are known.

Each category of BD, DVD, and CD includes, as a read-only optical disc, BD-ROM (Blu-ray Disc-Read Only Memory), DVD-ROM (Digital Versatile Disc-Read Only Memory), CD-ROM (Compact Disc-Read Only Memory), respectively.

In these read-only discs, contents data of music and picture are recorded as data that is not physically rewritable such as emboss pit, for example. To manufacture the read-only disc, first, master data containing contents data is prepared in authoring. Then, in mastering step in a practical factory, a master disc in which a concavo-convex pit array based on the master data containing the contents data and management information is formed is produced, and then master disc and a stamper are manufactured. Then, optical discs are mass-produced by using the stamper.

In this way, the read-only discs in which the same data is recorded are mass-produced with the same title (as discs containing the same content).

On the other hand, as described in the above-described PTLs 1 and 2, a method of adding unique information to each of read-only discs mass-produced in a state of containing the same data has been known.

The method is typified by a method using BCA (Burst Cutting Area).

For example, in an optical disc such as BD and DVD, BCA is provided in a predetermined region in an inner peripheral side of a disc, as a bar-code-shaped recording region.

The BCA is a region from which information is allowed to be read out without tracking because a radial pattern is formed as regions different in reflectance. In particular, the BCA is used as a region where information unique to a disc can be added to the optical discs mass-produced, such as information including serial number, for example.

Specifically, the BCA makes it possible to write serial number, disc information, and the like into inner periphery (for example, a region of radius of 21 to 22 mm) of a signal region for each disc by a BCA recording apparatus through offline, to thereby enable management for each disc, after the optical disc is completed through manufacturing steps.

SUMMARY OF INVENTION

Incidentally, as for read-only discs, adding unique information in a group unit of manufacturing has been demanded.

Here, "group" refers to a group of a certain number of collection of discs. Examples of the group include a group according to sales destination, a group according to vendor (shipping destination as viewed from the disc manufacturing factory), a group according to manufacturing line, and group according to its usage (for example, for rent and for sale).

However, in manufacturing an optical disc added with such information unique to each group, it is necessary to record different information for each mastering. As a method of recording different information for each mastering as disc manufacturing for each group, normally, a method of performing authoring again irrespective of size of data to be replaced to reproduce the master data is general.

In the end, manufacturing discs that are discs with the same title but different between groups imposes labor equivalent to manufacturing optical discs with different titles, thereby reducing manufacturing efficiency.

Accordingly, it is conceivable to add information in a group unit with use of BCA. However, the BCA is essentially used to add information unique to a disc, and thus is not suitable for recording information in a group unit in some cases.

It is an object of the present disclosure to achieve a method of manufacturing a master disc, a method of manufacturing a recording medium, and a program that are capable of efficiently adding information in group unit as normal read-only data for read-only recording medium without using a special area such as BCA, and a suitable recording medium.

A method of manufacturing a master disc according to the present disclosure includes: a preprocessing step of, for master data having a data structure in which contents data and data to be replaced are managed by a file system, confirming the data to be replaced based on the file system and preparing replacement data; an exposure step of performing exposure of a recording medium master disc, based on the master data in which the data to be replaced is replaced with the replacement data; and a development step of performing development on the recording medium master disc subjected to the exposure to produce a recording medium master disc on which a concavo-convex pattern corresponding to the exposure is formed.

In this method of manufacturing the master disc, in a phase of the master data created in the authoring phase, since the data structure in which the contents data and the data to be replaced are managed by the file system is employed, it is possible to replace the data to be replaced with the replacement data in a phase of the master disc exposure. In other words, it is possible to manufacture a master disc for a read-only recording medium in which part of data is different, without performing authoring again.

A method of manufacturing a recording medium according to the present disclosure includes: a preprocessing step of, for master data having a data structure in which contents data and data to be replaced are managed by a file system, confirming the data to be replaced based on the file system and preparing a plurality of pieces of replacement data that are different for the recording medium to be manufactured on a group basis; an exposure step of performing exposure of a recording medium master disc, based on the master data in which the data to be replaced is replaced with the replacement data selected according to a group of the recording medium to be manufactured; a development step of performing development on the recording medium master disc subjected to the exposure to produce the recording medium master disc on which a concavo-convex pattern according to the exposure is formed; a stamper producing step of producing a stamper by using the recording medium master disc produced in the development step; and a medium producing step of producing a recording medium substrate by using the stamper and forming on the recording medium substrate a layer structure including a recording layer to produce the recording medium.

In this method of manufacturing the recording medium, the master data created in the authoring phase has the data structure in which the contents data and the data to be replaced are managed by the file system. Therefore, replacement data is prepared for each group, and the data to be replaced of the master data is allowed to be replaced with the replacement data of the corresponding group in the phase of the master disc exposure of the recording medium for each group. In other words, it is unnecessary to perform authoring phase again for each manufacturing of the recording medium for each group.

A program according to the present disclosure causes an information processor to execute: a step of, for master data having a data structure in which contents data and data to be replaced are managed by a file system as master data used in manufacturing of a recording medium master disc, confirming the data to be replaced based on the file system; and a step of preparing replacement data that is to be replaced with the data to be replaced.

With this program, it becomes possible to prepare replacement of the replacement data that is data in a group unit or the like in the preprocessing step (premastering) before the exposure step.

A program according to the present disclosure, as a program that causes processing of a control section of an exposure apparatus supplied with replacement data and master data containing data to be replaced and then performing exposure of a recording medium master disc to be executed, causing the control section to execute control of performing the exposure by laser light irradiation based on a modulation signal obtained from modulation processing of the master data, and performing replacement processing in which the data to be replaced in the master data used in the modulation processing is replaced with the replacement data.

With the program, it becomes possible to replace the data to be replaced with the replacement data in the exposure phase by the exposure apparatus.

A recording medium according to the present disclosure is a recording medium having a data structure managed by a file system. Contents data and replacement data that is arranged at a data position in a specific folder or a specific file are recorded, and the replacement data is recorded in the data position of the data structure at which data to be replaced is arranged upon manufacturing of the recording medium.

In the recording medium, for example, information unique to a group unit is added as the replacement data, and even in the case of the recording medium with the same title as mass products, information for each group is added as normal data. In other words, the information for each group is recorded as data readable based on the file system, similarly to the contents data.

According to the method of manufacturing the master disc and the method of manufacturing the recording medium of the present disclosure, it is possible to manufacture the recording medium master disc in which data unique on a group basis or the like are recorded as replacement data, of read-only recording media containing the same content, without performing the authoring again. In other words, it is possible to easily manufacture a master disc containing different recorded contents for each mastering.

Accordingly, it is possible to significantly improve manufacturing efficiency of the recording media with the same title containing information different between groups.

According to the program of the present disclosure, it is possible to achieve a premastering apparatus and an exposure apparatus that perform replacement processing in which data to be replaced in master data is replaced with replacement data.

Moreover, according to the recording medium of the present disclosure, it is possible to record group unique information not in a special form such as BCA but in a form of typical read-only data managed by a file system. Consequently, it is possible to provide a read-only recording medium including group unique information having reproducing compatibility and general versatility.

BRIEF DESCRIPTION OF DRAWINGS

FIG. 14 is an explanatory diagram of an example of a file in which replacement data is recorded, of the embodiment.

DESCRIPTION OF EMBODIMENTS

An embodiment of the present disclosure will be described below in the following order.
1. Outline of Manufacturing Processes and Data Replacement
2. Premastering Apparatus and Exposure Apparatus
3. Disc Manufacturing Processes
4. First Example of Premastering Processing and Exposure Processing
5. Second Example of Premastering Processing and Exposure Processing
6. Folder and File in which Replacement Data is Recorded
7. Programs 1. Outline of Manufacturing Processes and Data Replacement In the embodiment, as a recording medium, a read-only optical disc, particularly, a BD-ROM (Blu-ray disc-ROM) will be described as an example.

The BD (Blu-ray Disc) is briefly described.

The BD has a diameter of 120 mm and a disc thickness of 1.2 mm as a disc size. In other words, in these respects, the BD is similar in disc as CD scheme and DVD scheme, in terms of appearance.

Also, a so-called blue laser (for example, wavelength λ=405 nm) is used as a laser for recording and reproduction, and an optical system is set to have high NA (for example, NA=0.85). Further, a narrow track pitch (for example, track pitch=0.32 μm) and a high linear density (for example, linear recording density of 0.112 μm/bit) are achieved. Accordingly, a user data capacity of about 25 GB (Giga Byte) is achieved by a single layer in a disc having a diameter of 12 cm.

In addition, it is possible to achieve a capacity of about 27 GB by recording with higher density.

Moreover, a so-called multilayer disc including a plurality of recording layers has been developed, and in the case of the multilayer disc, the user data capacity is increased by times of the number of layers.

Figure 1:
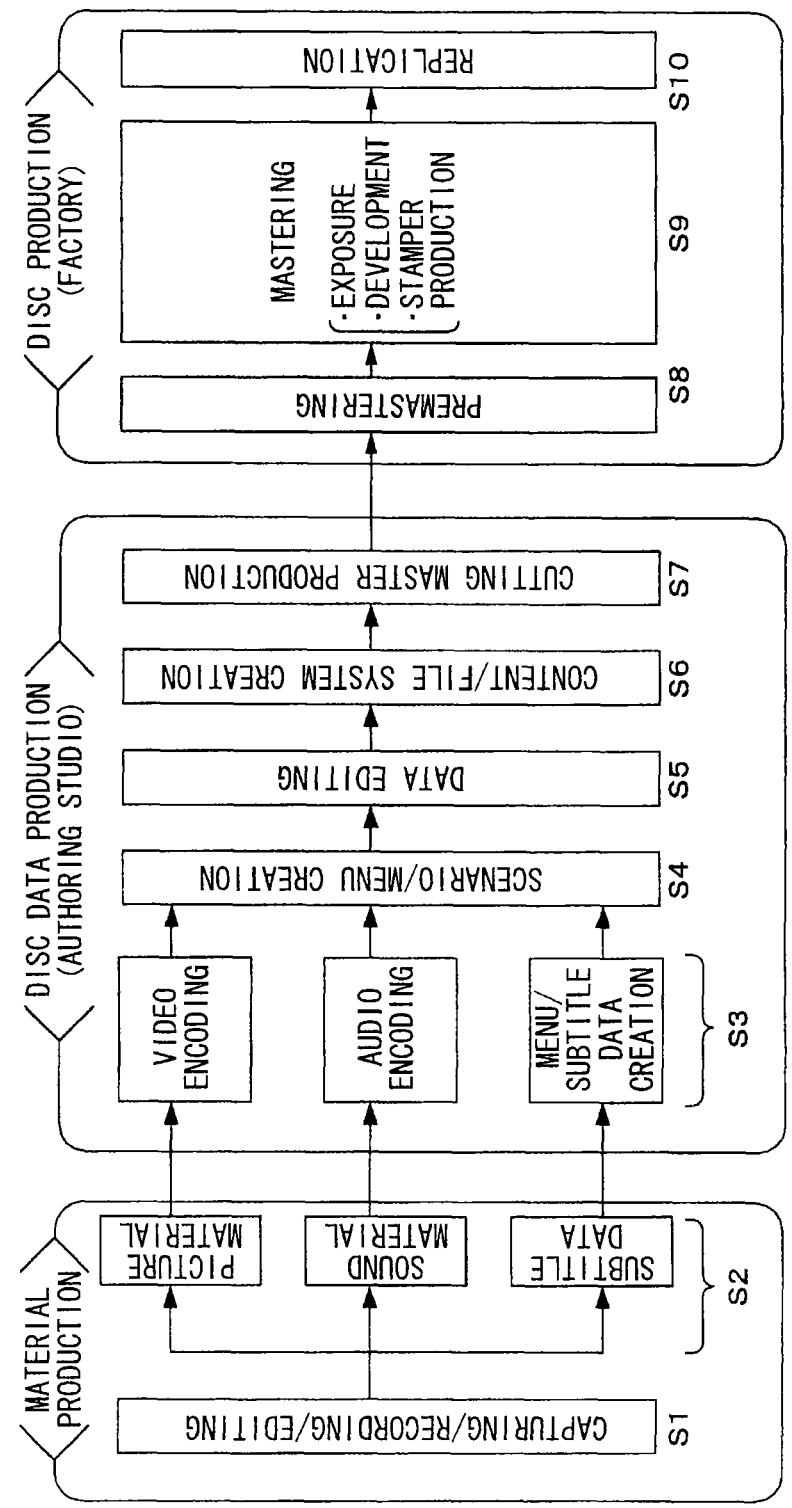
FIG. 1 is an explanatory diagram of flow of disc manufacturing according to an embodiment of the present disclosure.

A flow of manufacturing of an optical disc with use of an authoring system creating contents to be recorded, in manufacturing of BD-ROM that is one kind of such BDs, will be briefly described with reference to FIG. 1.

First, as material production, capturing of picture materials, recording of sound materials, editing, and the like are performed (S1). Data obtained from the capturing, the editing, and the like is stored as material data (such as picture materials, sound materials, and subtitle data) of contents to be produced (S2).

The various kinds of material data is brought to an authoring studio, and is used to produce disc data (contents).

In the authoring studio, with use of a personal computer installed with programs for authoring processing and necessary hardware, contents are produced using the various kinds of material data.

The picture materials and the sound materials are compressed and encoded to respective predetermined formats by processing of video encoding and sound encoding, respectively. In addition, menu data, subtitle data, and the like are created from subtitle data and the like (S3). Next, a scenario and a menu as contents construction are created (S4). Moreover, editing of various kinds of data is performed (S5).

After that, as contents and file system creation (S6), stream data configuring the contents are created, and a file system managing the contents data is built.

To create the contents data, encoded picture data, encoded sound data, menu, and the like are multiplexed. In this case, encoded contents data such as images, sounds, and subtitles stored in, for example, a hard disk are interleaved, and multiplexing in which data multiplexed with various kinds of format files are created is performed. The multiplexed data created finally becomes contents data.

In this way, the contents data is created and the file system that manages the contents data and other various kinds of data is built to prepare a data group to be recorded in a disc.

Finally, master data (cutting master for disc manufacturing) of data structure including contents data and the like that are managed by the file system is produced (S7).

The cutting master is stored in, for example, a hard disk in a personal computer.

The cutting master is sent to a factory for disc manufacturing.

In the disc manufacturing factory, as premastering (S8), master data (mastering data for exposure) in a state where data is encrypted and signature data is added is produced.

Note that, in the following, the master data in a phase of being processed in premastering is referred to as "cutting master", and the master data subjected to premastering processing is referred to as "mastering data" for discrimination purpose.

The mastering data subjected to the premastering processing is used in a mastering step (S9). In the mastering step, a master disc is manufactured through exposure and development, and a stamper is produced using the master disc.

First, as the exposure, laser irradiation is performed on a master disc, based on a signal that is obtained by modulating the mastering data. In the development processing, a master disc in which exposure sections and non-exposure sections are formed to have a concavo-convex pattern (pit array) is completed. After that, a stamper to which the concavo-convex pattern of the master disc is transferred is created.

Finally, as replication (S10), a disc substrate is produced using the stamper, and predetermined layer structure is formed on the disc substrate to obtain an optical disc (BD-ROM) as a finished product.

In such a flow of disc manufacturing, in the present embodiment, a method of manufacturing optical discs with the same title that contain the same contents data but are added with unique information different between groups is provided.

The "group" as used herein refers to a group of a certain number of collection of discs, and as described previously, for example, is a group according to sales destination, a group according to vendor, a group according to manufacturing line, and a group according to its usage.

For example, in the case where the manufactured optical discs are delivered to a plurality of vendors, the optical discs delivered to each of the vendors are optical discs that contain the same contents data but are added with information unique to each vendor.

Figure 2:
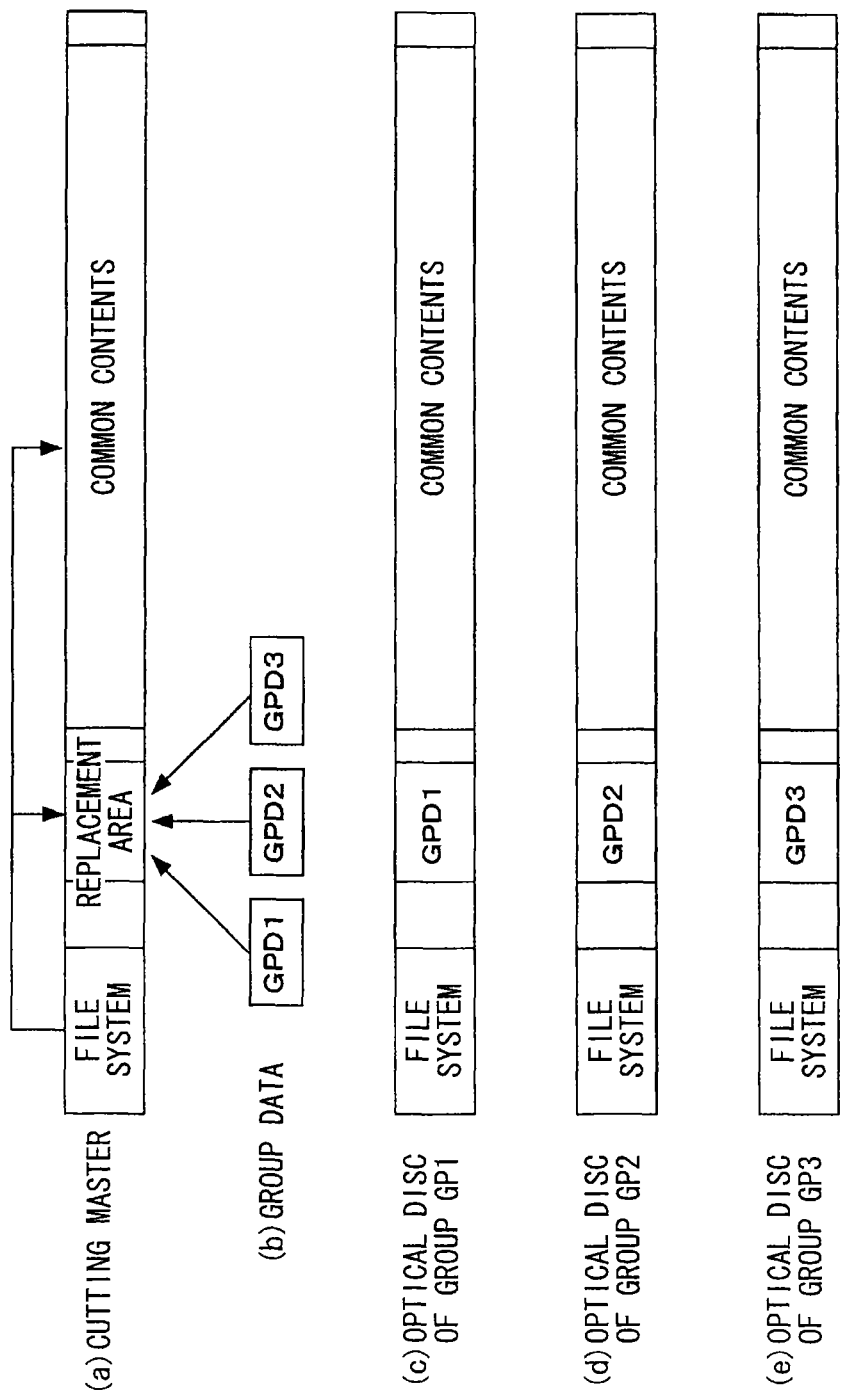
FIG. 2 is an explanatory diagram of data replacement of the embodiment.

A schematic description is given with reference to FIG. 2.

As illustrated in (a) of FIG. 2, the cutting master includes a data structure in which common contents data and replacement area are managed by the file system.

The "common contents" refers to contents data with the same contents irrespective of groups.

The "replacement area" indicates a section where data to be replaced is arranged on the cutting master. The "replacement area" is not necessarily physically continuous region, and indicates a data position managed by the file system, as a position at which the data to be replaced is recorded.

The cutting master manufactured in the above-described authoring step has data of such a data structure. Although the replacement area is not present in the existing cutting master, in the case of the present embodiment, a data position at which data to be replaced is arranged is present as the replacement area, and the data position is managed by the file system. Note that, specifically, the data to be replaced may be dummy data.

In the premastering step in which such a cutting master is supplied, group data GPD (GPD1, GPD2, GPD3, . . . ) as illustrated in (b) of FIG. 2 is prepared as data unique to each group.

The group data GPD may be text data, code data such as group ID, control data, image data, and various kinds of data depending on the purpose of adding the group data.

For example, as a group GP1, in the case where the optical disc to be provided to a specific vendor is manufactured, the data to be replaced that is arranged in the replacement area is replaced with the group data GPD1 in premastering phase or the exposure phase. Based on the mastering data in a state of being replaced with the group data GPD1, mastering (exposure and development) of the master disc is performed, and a stamper is produced from the master disc.

A number of optical discs mass-produced using that stamper become the optical discs of the group GP1 in (c) of FIG. 2. Each of the optical discs has the data structure in which the common contents and the group data GPD1 are managed by the file system. Specifically, when the optical disc is loaded to a reproducing apparatus normally, both the contents data and the group data GPD1 are readable based on the file system.

In addition, as a group GP2, in the case where the optical disc to be provided to another specific vendor is manufactured, the data to be replaced that is arranged in the replacement area is replaced with the group data GPD2 in the premastering phase or the exposure phase. Based on the mastering data in a state of being replaced with the group data GPD2, the mastering (the exposure and the development) of the master disc is performed, and a stamper is produced from that master disc.

A number of optical discs mass-produced using that stamper become the optical discs of the group GP2 in (d) of FIG. 2. Specifically, each of the optical discs has the data structure in which the common contents and the group data GPD2 are managed by the file system, and when the optical disc is loaded to a reproducing apparatus, both the contents data and the group data GPD2 are readable based on the file system.

Moreover, as a group GP3, in the case where the optical disc to be provided to still another specific vendor is manufactured, the data to be replaced that is arranged in the replacement area is replaced with the group data GPD3 in the premastering phase or the exposure phase. Then, the mastering (the exposure and the development) of the master disc is performed, and a stamper is produced from that master disc.

A number of optical discs mass-produced using that stamper become the optical discs of the group GP3 in (e) of FIG. 2. Specifically, each of the optical discs has the data structure in which the common contents and the group data GPD3 are managed by the file system, and when the optical disc is loaded to a reproducing apparatus, both the contents data and the group data GPD3 are readable based on the file system.

In the past, in optical disc manufacturing in order to make a part of contents different for each mastering, it is necessary to create the master data, that is, to perform authoring again.

But here, optical disc such as BD and DVD having a file system is subjected to setting of the replacement area, and the replacement area is placed under the management of the file system. This makes it possible to replace the data contents in the replacement area each time the cutting (exposure) is performed. As a result, a master disc having different recorded contents for each mastering, that is, a master disc having different group data GPD between groups is easily manufactured. In addition, since the data is normal data managed by the file system, the optical disc to be manufactured is very much the same physically and logically as a normal optical disc, and thus there is no difficulty in terms of reproducing compatibility, etc.

The group data GPD is handled as the file data, making it possible to easily read out from the optical disc.

2. Premastering Apparatus and Exposure Apparatus

A premastering apparatus and an exposure apparatus (a cutting apparatus) used in a manufacturing method of the embodiment will be described.

Figure 3:
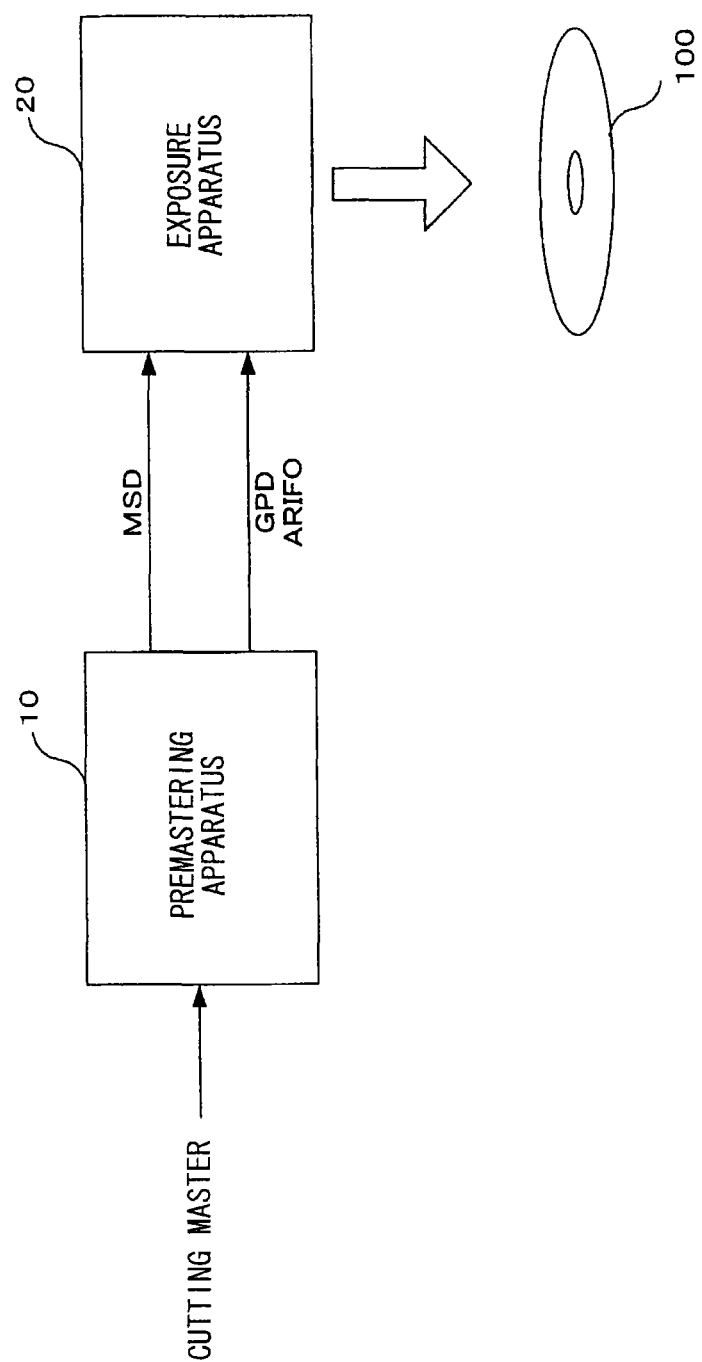
FIG. 3 is a block diagram of a premastering apparatus and an exposure apparatus of the embodiment.

FIG. 3 illustrates a premastering apparatus 10 and an exposure apparatus 20.

The premastering apparatus 10 is supplied with cutting master produced by authoring.

The premastering apparatus 10 performs predetermined encryption processing, addition of signature data, and the like on the cutting master to produce exposure-use master data (mastering data MSD), and then supplies the produced master data to the exposure apparatus 20. In addition, the premastering apparatus 10 produces the group data GPD (GPD1, GPD2, GPD3, . . . ), and supplies the group data GPD, area information ARIFO indicating a replacement area, and the like to the exposure apparatus 20.

Incidentally, the group data GPD, the area information ARIFO, and the like are supplied to the exposure apparatus 20 when premastering processing and exposure processing as a first example described later are employed. In the first example, data replacement is performed on the exposure apparatus 20 side.

In a second example, data replacement is performed on the premastering apparatus 10 side. Therefore, the mastering data MSD that has been already subjected to replacement is supplied to the exposure apparatus 20.

The exposure apparatus 20 performs laser irradiation on the master disc based on the mastering data MSD, and forms an exposure pattern according to the mastering data MSD. The exposure pattern forms the concavo-convex pattern in the development processing, and the master disc 100 is manufactured.

Figure 4:
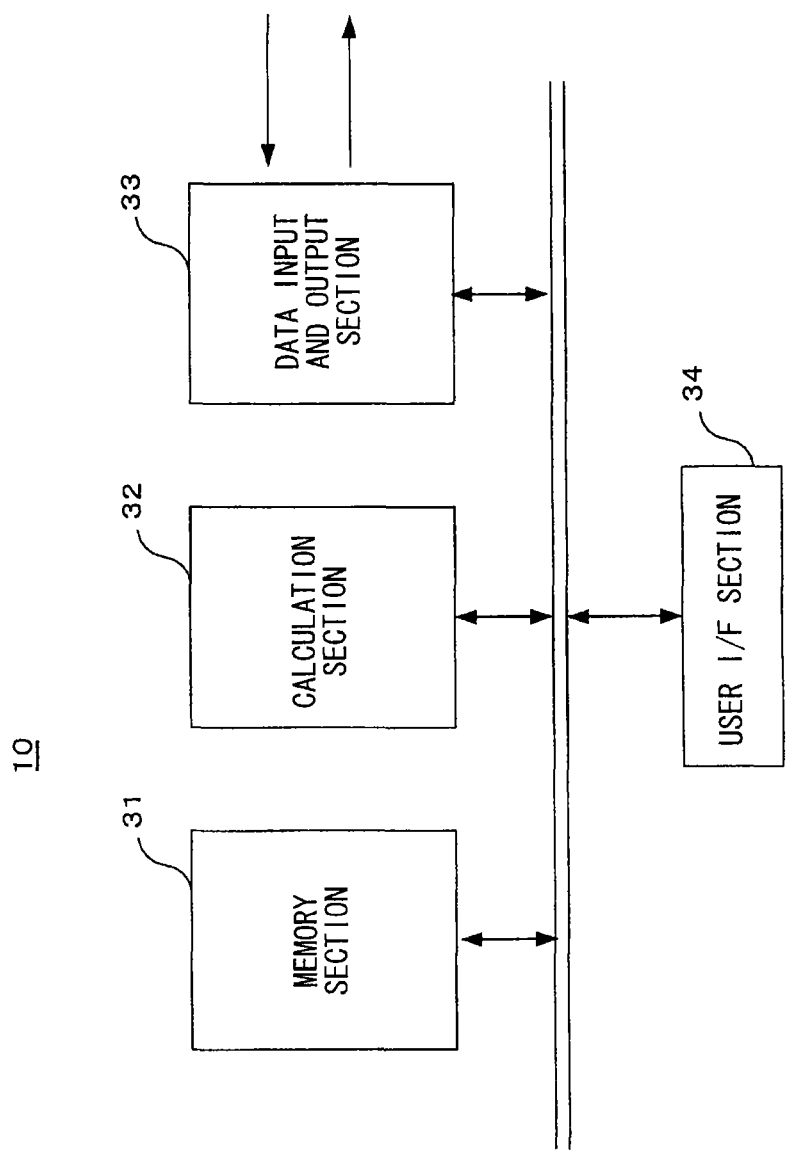
FIG. 4 is a block diagram of the premastering apparatus of the embodiment.

FIG. 4 illustrates a block diagram of a configuration example of the premastering apparatus 10.

The premastering apparatus 10 is achievable by a general-purpose computer, besides a dedicated apparatus performing premastering processing, for example.

The premastering apparatus 10 includes a memory section 31, a calculation section 32, a data input and output section 33, and a user interface section 34. Needless to say, other components may be included therein.

The data input and output section 33 performs transmission and reception of data with another apparatus. For example, the cutting master produced by authoring is input through the data input and output section 33 via communication with an authoring system, communication with a reproducing apparatus for a recording medium containing the cutting data, or the like.

In addition, the mastering data MSD processed by the premastering apparatus is transmitted from the data input and output section 33 to the exposure apparatus 20.

The memory section 31 has a memory region formed by a solid-state memory, a hard disk, or the like, and is used, for example, to store the input cutting master, to store data in the premastering process and the mastering data MSD, and to store the group data GPD.

The calculation section 32 performs processing such as encryption and setting of signature data as premastering processing with respect to the cutting master. Further, in the present example, the calculation section 32 also performs processing such as analysis of the file system of the cutting master, confirmation of the replacement area, and setting of the group data GPD.

The user interface section 34 is an interface with an operator of the premastering processing, and includes input devices such as a keyboard and a mouse, and output devices such as a monitor display.

In the premastering apparatus 10, the calculation section 32 executes various kinds of calculation as the premastering processing, based on instruction of the operator from the user interface section 34. Then, the produced mastering data MSD, the group data GPD, and the like are stored in the memory section 31, and are transmitted to the exposure apparatus 20 at a predetermined timing.

Figure 5:
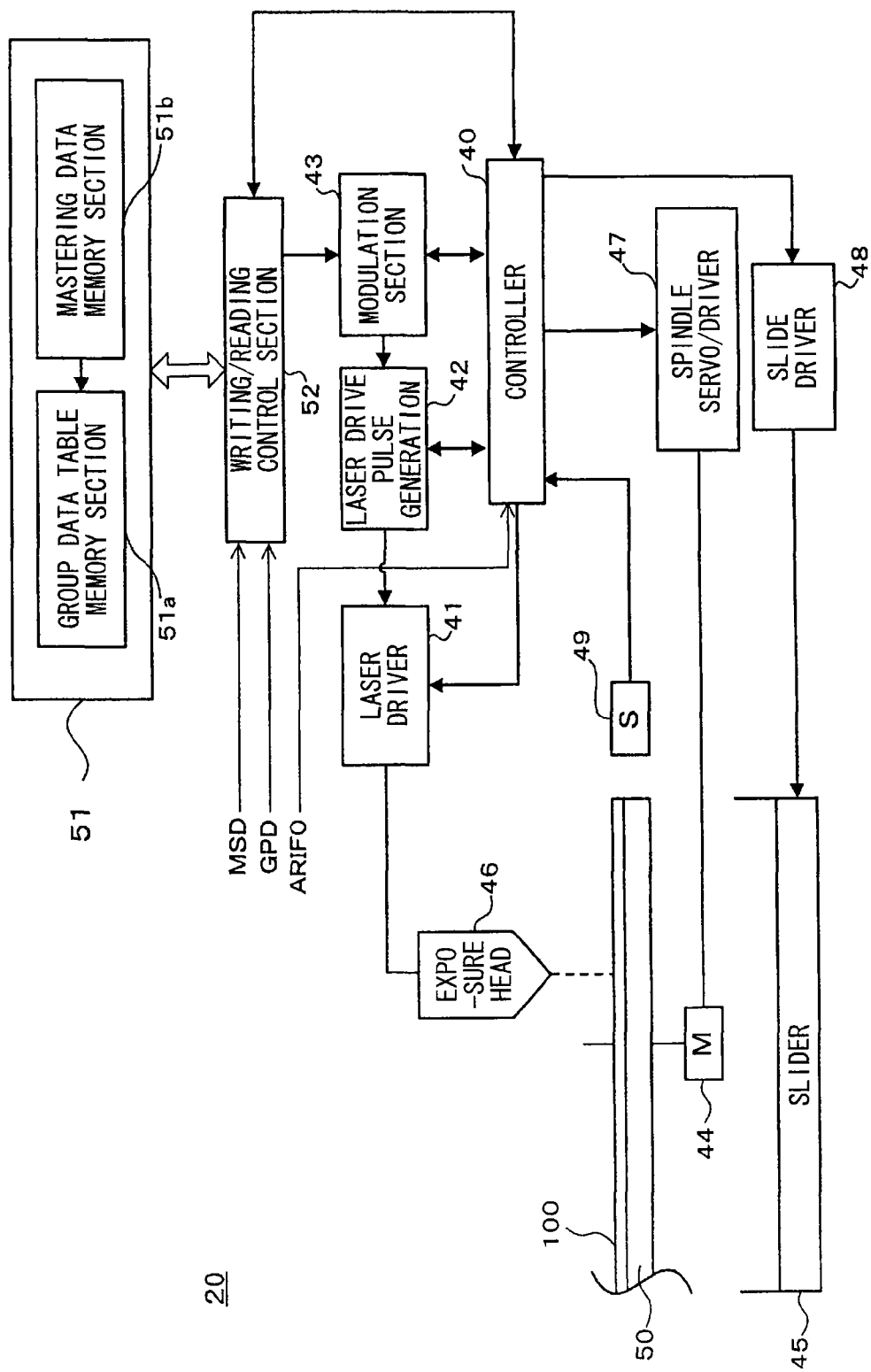
FIG. 5 is a block diagram of the exposure apparatus of the embodiment.

Subsequently, a configuration example of the exposure apparatus 20 will be described with reference to FIG. 5.

The exposure apparatus 20 includes a controller 40, a laser driver 41, a laser drive pulse generation section 42, a modulation section 43, a spindle motor 44, a slider 45, an exposure head 46, a spindle servo/driver 47, a slide driver 48, a sensor 49, and a turn table 50. In addition, the exposure apparatus 20 includes a memory section 51 and a writing/reading control section 52.

The memory section 51 is prepared with a mastering data memory section 51b that stores the mastering data MSD supplied from the premastering apparatus 10.

In addition, when the processing of the first example described later is employed, the memory section 51 is also prepared with a region as a group data table memory section 51a that stores the group data GPD supplied from the premastering apparatus 10.

Moreover, when the processing of the first example described later is employed, the area information ARIFO from the premastering apparatus 10 is supplied to the controller 40. The controller 40 receives the area information ARIFO to figure out the region (the data position) where the data to be replaced is arranged in a data stream as the mastering data.

Incidentally, when the processing of the second example described later is employed, in the memory section 51, the mastering data MSD may be stored in the mastering data memory section 51b, and the region as the group data table memory section 51a is not necessary. However, in this case, the mastering data memory section 51b may store therein a plurality of pieces of mastering data different between groups in some cases.

The writing/reading control section 52 executes writing and reading of data with respect to the memory section 51. Specifically, the writing/reading control section 52 executes writing, to the memory section 51, the mastering data MSD, the group data GPD, and the like that are supplied from the premastering apparatus 10. In addition, the writing/reading control section 52 reads out the mastering data MSD and the group data GPD from the memory section 51 and supplies the read data to the modulation section 43, according to the instruction of the controller 40, at the time of master disc exposure.

An exposure-use laser light source and a necessary optical system are mounted in the exposure head 46. The laser light source emits light based on a drive signal from the laser driver 41.

The modulation section 43 outputs a modulation signal that is obtained by performing predetermined modulation processing on the mastering data MSD and the group data GPD read out from the memory section 51 by the writing/reading control section 52. When the cutting of the ROM disc to which a pit array is exposed is performed, a modulation signal for performing ON/OFF modulation operation of the laser light source is generated.

For example, the modulation section 43 outputs an RLL(1-7) modulation signal relating to data stream containing data to be recorded in the optical disc, such as contents data, data of the file system itself, and the group data GPD.

The modulation signal is converted into a laser drive pulse by the laser drive pulse generation section 42.

The laser drive pulse generation section 42 supplies the laser drive pulse to the laser driver 41. The laser driver 41 supplies a drive signal to the exposure-use laser light source in the exposure head 46, based on the laser drive pulse.

As a result, recording laser light from the exposure-use laser light source becomes modulated light according to the pit array, and thus the exposure pattern corresponding to the pit array is formed on the master disc 100.

The master disc 100 is mounted on the turn table 50, and is driven and rotated by the spindle motor 44.

The spindle motor 44 is driven and rotated while the rotating velocity is controlled by the spindle servo/driver 47. Therefore, the muster disc 100 is rotated at, for example, a constant linear velocity or a constant angular velocity.

The slider 45 is driven by the slide driver 48, and moves the entire base including the turn table 50 on which the master disc 100 is mounted and a spindle mechanism. Specifically, the master disc 100 in a state of being rotated by the spindle motor 44 is exposed by the laser light from the exposure head 46 while being moved in a radius direction by the slider 45 so that a track formed by a pit array exposed is formed in a spiral shape.

A position of movement by the slider 45, that is, the exposure position of the master disc 100 (the disc radius position: slider radius position) is detected by the sensor 49. Position detection information by the sensor 49 is supplied to the controller 40.

The controller 40 controls the entire exposure apparatus 20. Specifically, the controller 40 performs reading of the mastering data MSD, the group data GPD, and the like by the writing/reading control section 52, control of pulse generation parameters by the laser drive pulse generation section 42, laser power setting to the laser driver 41, spindle rotating operation control by the spindle servo/driver 47, and control of the moving operation of the slider 45 by the slide driver 48.

3. Disc Manufacturing Step

The disc manufacturing steps performed in a disc manufacturing factory described with reference to FIG. 1, namely, the premastering (S8), the mastering (S9), and the replication (S10) are illustrated in detail in FIG. 6, and are described with reference to FIG. 7 and FIG. 8.

Figure 6:
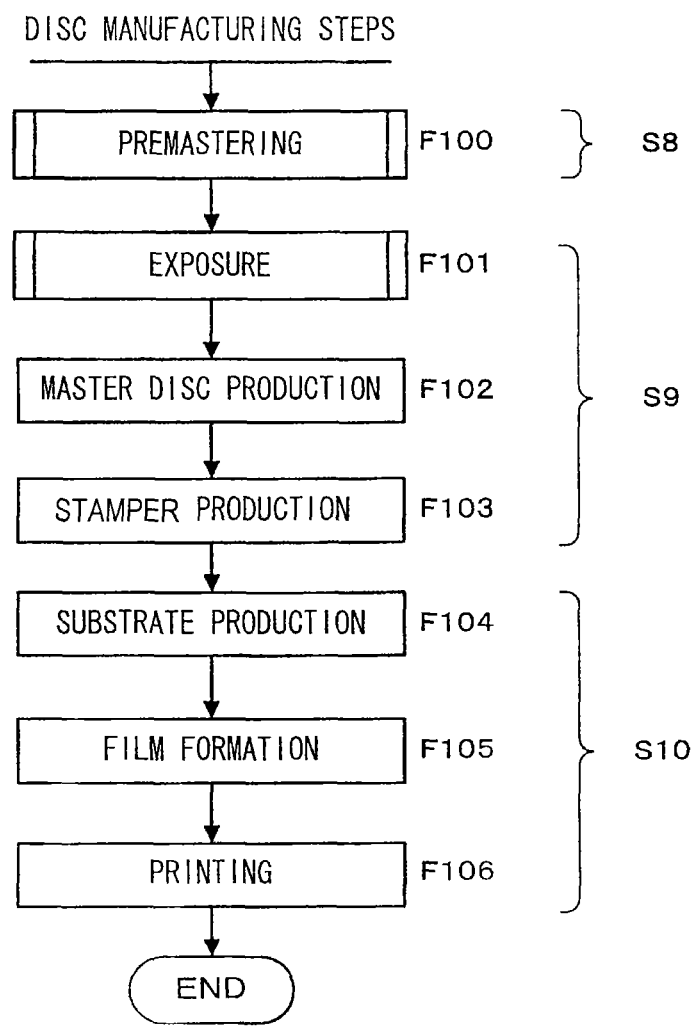
FIG. 6 is a flowchart of disc manufacturing processes of the embodiment.

The premastering is performed as a step F100 of FIG. 6. As described above, the premastering apparatus 10 performs premastering processing on the cutting master. The detail will be described later as the first example and the second example of the premastering processing.

After the premastering processing in the step F100, the mastering data MSD is transferred to the exposure apparatus 20. Then, the mastering (S9) is performed as steps F101 to F103. First, in the step F101, the exposure apparatus 20 performs exposure on the master disc.

Figure 7:
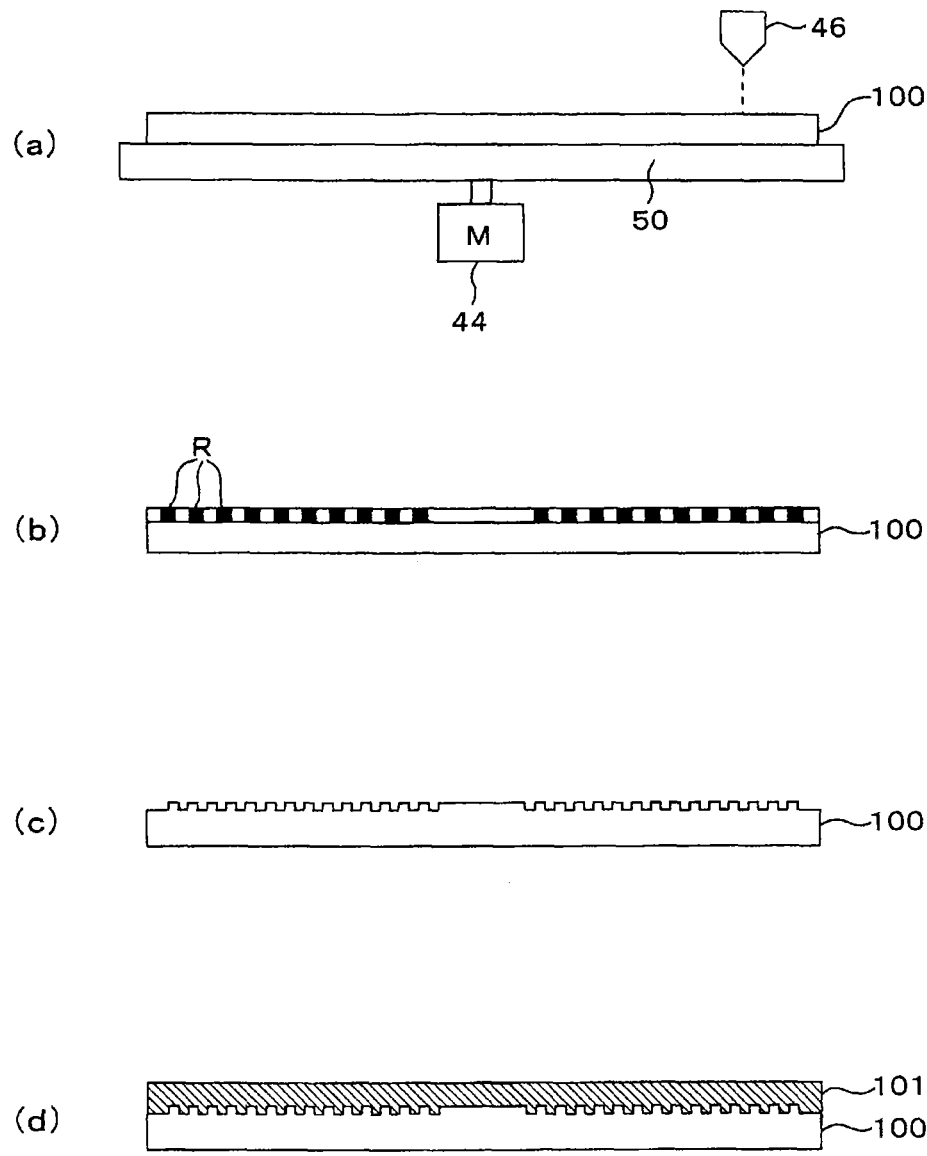
FIG. 7 is an explanatory diagram of the disc manufacturing processes of the embodiment.

For example, as illustrated in (a) of FIG. 7, laser light that is modulated according to the mastering data MS is applied from the exposure head 46 onto the master disc 100 on which resist such as inorganic resist is applied, to perform exposure according to the pit pattern. As a result, as illustrated in (b) of FIG. 7, exposure sections R are formed.

Note that the detail of the exposure processing will also be described later as the first example and the second example.

Next, master disc is produced as the step F102.

For example, development is performed on the exposed master disc 100 illustrated in (b) of FIG. 7, and the master disc 100 in which the exposure sections are in a concave shape as illustrated in (c) of FIG. 7 is manufactured. The concave sections correspond to pits in the completed optical disc.

Next, a stamper is produced in the step F103.

For example, a stamper 101 on which the concavo-convex of the master disc 100 is transferred is fabricated by nickel electroforming using the master disc 100 ((d) of FIG. 7). In the concavo-convex pattern of the stamper 101, the sections corresponding to the pits are in a convex shape.

Subsequently, disc manufacturing (the replication S10) is performed using the stamper 101 in steps F104, F105, and F106.

First, a disc substrate is manufactured using the stamper 101 in the step F104.

Figure 8:
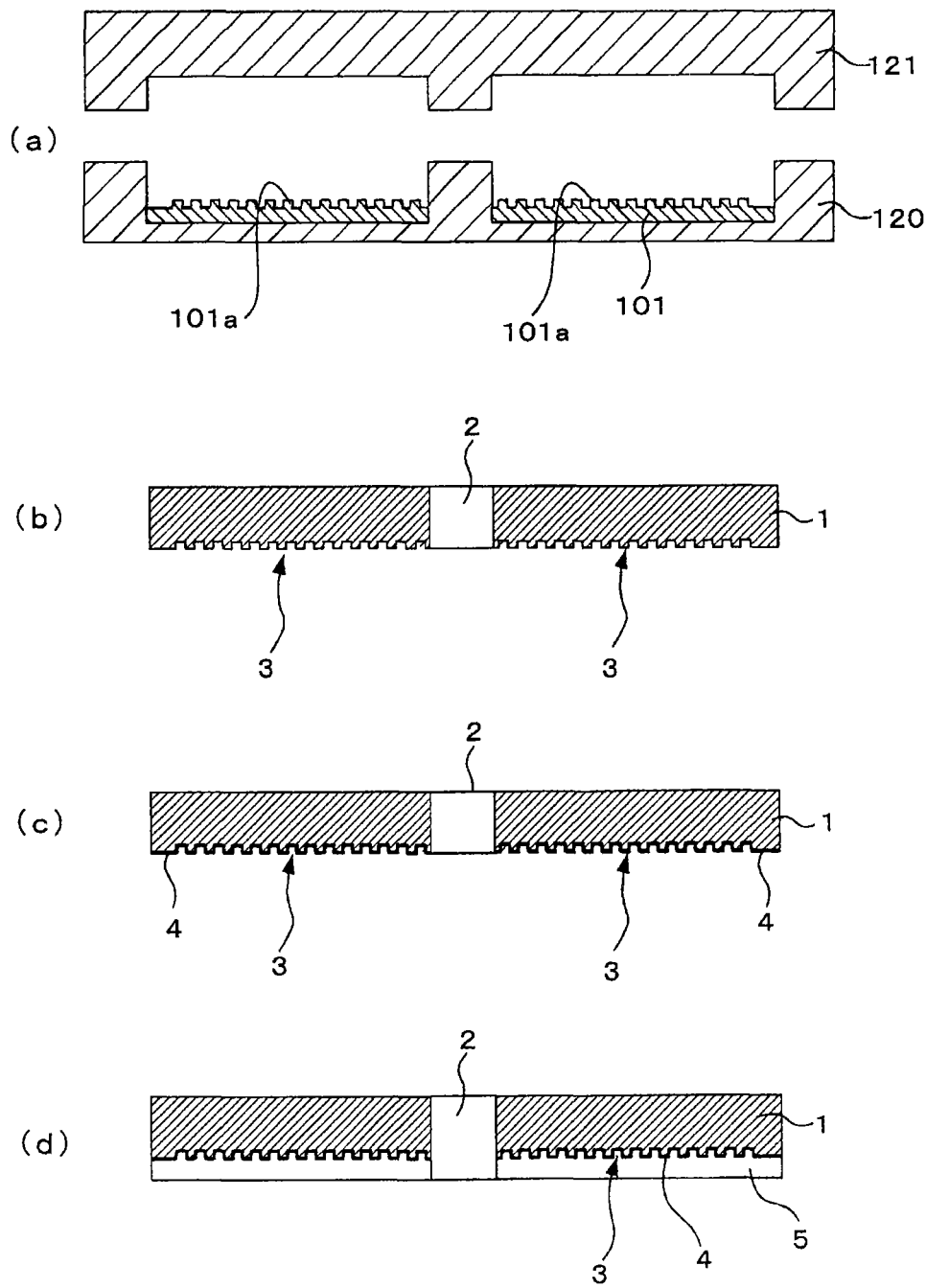
FIG. 8 is an explanatory diagram of the disk manufacturing processes of the embodiment.

As illustrated in (a) of FIG. 8, the stamper 101 is disposed on a mold for substrate formation. The mold is configured of a lower cavity 120 and an upper cavity 121, and the stamper 101 is disposed on the lower cavity 120 to transfer the pit array.

A substrate 1 is formed through injection molding of, for example, polycarbonate resin using such a mold, and the formed substrate 1 is as illustrated in (b) of FIG. 8.

Specifically, the substrate 1 made of polycarbonate resin includes a center hole 2 at the center thereof, and the information reading surface side thereof includes a pit pattern 3 that is obtained by transferring the concavo-convex pattern 101a formed on the stamper 101 in the mold.

Subsequently, film formation is performed on the substrate 1 thus formed in the step F105.

First, a reflective film 4 is formed on the pit pattern transferred from the stamper 101 by sputtering. Specifically, as illustrated in (c) of FIG. 8, the reflective film 4 is formed using, for example, an Ag alloy on a signal read surface side on which the pit pattern 3 is formed.

Further, a cover layer 5 is formed by, for example, spin coating of ultraviolet curable resin as illustrated in (d) of FIG. 8.

Note that hard coat processing may be further performed on a surface of the cover layer 5 in some cases.

Incidentally, although illustrated here is the case of a single-layer disc including one recording layer, a formation step of each recording layer is added in the case of a multi-layer disc including two or more recording layers.

After the foregoing film formation step, printing is performed on label surface side in the step F106, and thus an optical disc is completed.

The optical disc is manufactured through the above-described steps. In particular, the step F104 and subsequent steps are mass-production steps.

In the case of the present embodiment, the premastering processing in the step F100 and the exposure processing in the step F101 are performed in a manner exemplified by the first example or the second example described below allowing the read-only optical disc manufactured in the above-described way to be recorded therein with the group data GPD as illustrated in (c), (d), and (e) of FIG. 2.

In other words, the optical disc manufactured in the above-described steps has the data structure in which the read-only contents data and the data to be replaced that is arranged at the data position in a specific folder or a specific file are managed by the file system, and the data to be replaced is replaced with the read-only replacement data (the group data GPD) and recorded.

4. First Example of Premastering Processing and Exposure Processing

The first example of the premastering processing and the exposure processing will be described with reference to FIG. 9 and FIG. 10, respectively.

Figure 9:
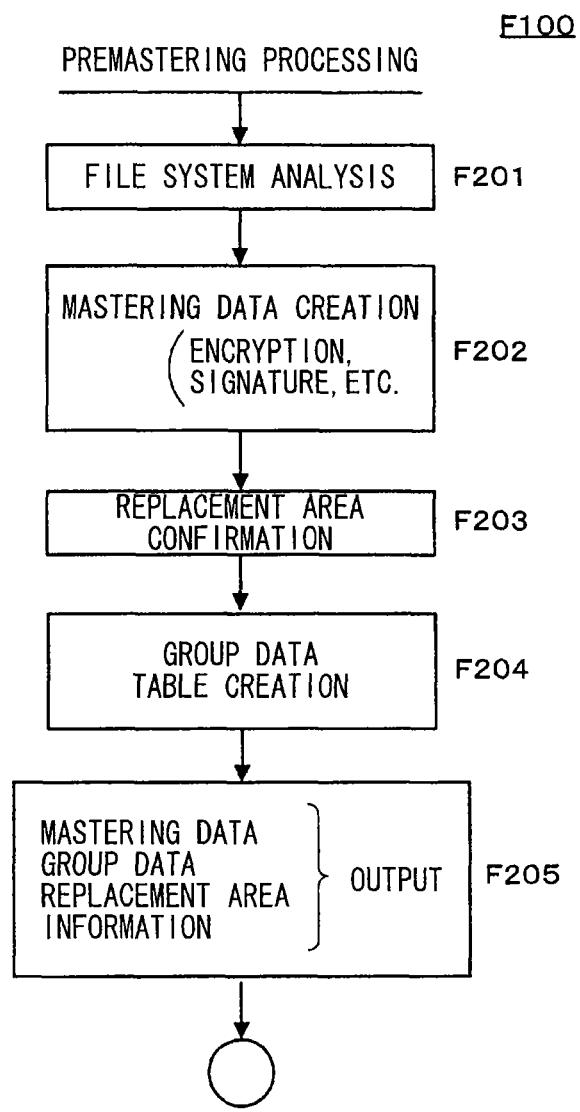
FIG. 9 is a flowchart of a first example of premastering processing of the embodiment.

In the case of the first example, processing of FIG. 9 is performed as the premastering processing in the step F100 of FIG. 6. FIG. 9 illustrates processing executed by the calculation section 32 of the premastering apparatus 10 based on a program.

The calculation section 32 analyzes the file system in the cutting master as a step F201. Specifically, the calculation section 32 confirms the file system to figure out the data structure and the contents, in the cutting master that has been supplied through the authoring and has been stored in the memory section 31.

Then, the calculation section 32 creates the mastering data MSD in a step F202. In this case, the calculation section 32 performs processing such as encryption processing of predetermined data of the cutting master and addition of signature data to create the mastering data MSD. The mastering data MSD is stored in the memory section 31.

Next, in a step F203, the calculation section 32 confirms the replacement area based on the file system that is previously analyzed. As described with reference to (a) of FIG. 2, the cutting master has been formed in a state where the replacement area is managed by the file system, in the authoring phase.

The calculation section 32 confirms the data position of the replacement area and the size of the replacement data.

Then, the calculation section 32 generates and prepares a group data table in a step F204.

The group data table is a table in which the group data GPD1, GPD2, ... are set for groups GP1, GP2, ..., respectively. Such a group data table is prepared and is stored in the memory section 51.

The specific contents of each group data GPD may be created based on input by the operator, or alternatively, various kinds of group data contents may be previously stored in the memory section 51 or the like and pieces of the group data GPD corresponding to respective groups necessary for the optical disc to be manufactured at this time may be selected based on input by the operator or the like.

After the above-described processing is finished, the calculation section 32 outputs the mastering data MSD and the group data table stored in the memory section 51 to the exposure apparatus 2 in a step F205. Further, the calculation section 32 supplies the information of the replacement area (such as the position of the replacement area on the data stream of the mastering data MSD) confirmed in the step F203 to the exposure apparatus 20 as the area information ARIFO.

As described with reference to FIG. 5, the mastering data MSD and the group data table are stored in the memory section 51 (the mastering data memory section 51b and the group data table memory section 51a) of the exposure apparatus 20. In addition, the area information ARIFO is supplied to the controller 40.

After that, the exposure processing in the step F101 of FIG. 6 is executed by the exposure apparatus 20. FIG. 10 illustrates the exposure processing executed by the exposure apparatus 20. FIG. 10 illustrates the processing executed by the controller 40 of the exposure apparatus 20 based on a program.

First, the controller 40 performs group setting in a step F251. This is processing for setting which group's master disc is to be manufactured in the mastering to be performed. Actually, the group may be selected according to the input by the operator. The input by the operator is performed through the user interface section not illustrated in FIG. 5 in the exposure apparatus 20. Alternatively, if system connection is established between the premastering apparatus 10 and the exposure apparatus 20, instruction input to the exposure apparatus 20 may be performed through the user interface section 34 of the premastering apparatus 10.

The controller 40 selects and sets a specific group, and determines the group data to be used at this time from the group data table in the step F251. For example, at this time, if the mastering for manufacturing the optical discs of the group GP1 is to be performed, the controller 40 selects the group GP1, and the group data GPD1 associated with the group GP1 in the group data table is handled as the group data to be used.

Subsequently, the controller 40 performs exposure starting control in a step F252.

The controller 40 instructs the writing/reading control section 52 to read out the mastering data MSD, and starts operation of each of the modulation section 41, the laser drive pulse generation section 42, the laser driver 41, and the exposure head 46. In addition, the controller 40 instructs the spindle servo/driver 47 and the slide driver 48 to perform rotational driving of the master disc.

As a result, the exposure on the master disc 100 based on the mastering data MSD is started.

After the exposure is started, the controller 40 monitors whether the data position of the mastering data MSD has reached the replacement area or not, in a step F253. For example, the controller 40 monitors whether the data position of the mastering data MSD (the address of the mastering data MSD on the data stream) that is currently transferred to the modulation section 43 has reached the data position in the replacement area that is figured out from the area information ARIFO, through communication with the writing/reading control section 52.

Then, at a timing of the data position reaching the replacement area, the controller 40 proceeds the process from the step F253 to a step F254 to instruct the writing/reading control section 52 to read out the group data. In other words, the controller 40 causes the writing/reading control section 52 to read out, for example, the group data GPD1 that is determined in the step F251, from the memory section 51, and to transfer the group data GPD1 to the modulation section 43.

As a result, the group data GPD is modulated from the time point of the step F254, and laser exposure based on the modulation signal is performed.

The controller 40 monitors the completion timings of the reading and the transferring to the modulation section 43 of the group data GPD in a step F255. Then, at the timing of the completion of the reading, the process proceeds to a step F256, and the exposure by the mastering data MSD is restarted. In other words, the controller 40 instructs the writing/reading control section 52 to read out the mastering data MSD and to transfer the mastering data MSD to the modulation section 43. In this case, data continuous from the data to be replaced in the mastering data MSD and subsequent data are transferred to the modulation section 43.

Specifically, in the processes of the steps F253 to F256, when the stream data of the mastering data MSD is read out from the memory section 51 and is transferred to the modulation section 43, the group data is read out and is then transferred to the modulation section 43 during a period in which the data to be replaced in the mastering data MSD is transferred. Therefore, as viewed from the modulation section 43, the mastering data in which the data to be replaced is replaced with the group data GPD is supplied. Accordingly, in the exposure step based on the series of the mastering data stream, the exposure of pit array in a state where the data to be replaced in the mastering data MSD is replaced with the group data GPD is performed.

After that, the controller 40 monitors completion of the exposure of the mastering data MSD in a step F257, and terminates the exposure operation by each section at the timing of the exposure completion in a step F258.

Figure 10:
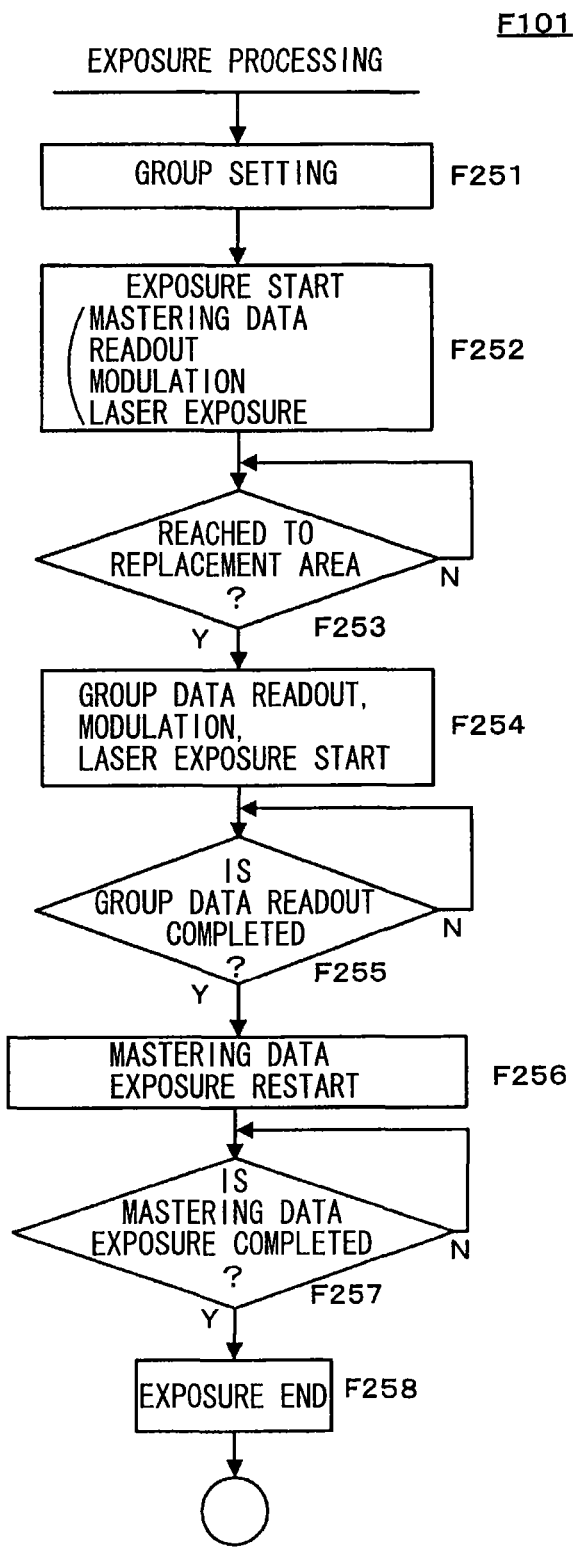
FIG. 10 is a flowchart of a first example of exposure processing of the embodiment.

Note that, in the example of FIG. 10, it is assumed that the replacement area is one data position range continuous on the stream of the mastering data MSD. If a plurality of replacement areas is present on positions distanced from one another on the stream, the processing in the steps F253 to F256 may be performed multiple times.

The exposure processing is performed as described above, and the steps F102 and F103 of FIG. 6 are then performed. In the master disc produced in the step F102 and the stamper produced in the step F103, a pit array in a state where the data to be replaced in the mastering data MSD is replaced with, for example, the group data GPD1 is formed.

Thereafter, the optical disc is manufactured in the steps F104 to F106 of FIG. 6, and the optical disc is obviously an optical disc that has the data structure containing the group data GPD1 as illustrated in (c) of FIG. 2. In other words, the optical disc is an optical disc in which the read-only contents data and the group data GPD1 are managed by the file system.

According to the manufacturing method of the first example described above, it is possible to manufacture the master disc 100 containing the group data GPD unique to each group, of the read-only discs containing the same content, without performing the premastering and the authoring again.

For example, in the case of manufacturing the optical discs of the group GP1, the group data GPD1 is selected in the step F251 of FIG. 10 described above, and one master disc 100 is produced. Then, the optical discs of the group GP1 are allowed to be mass-produced based on that master disc 100.

Moreover, in the case of manufacturing the optical discs of the group GP2, the group data GPD2 is selected in the step F251 of FIG. 10 described above, and one master disc 100 is manufactured. Then, the optical discs of the group GP2 are allowed to be mass-produced based on that master disc 100.

In this manner, it is sufficient for the disc manufacturing steps for each group to perform only the mastering and the subsequent steps for each group. Therefore, it is not necessary to perform again master data creation by authoring and premastering processing, and thus manufacturing efficiency in the case of manufacturing optical discs of a large number of groups is remarkably improved.

In other words, the manufacturing efficiency of the recording media with the same title containing different information between the groups is largely improved.

In addition, since this does not involve individual creation of mastering data for each group, load on the memory capacity for storing the master data (for example, the memory capacity of the memory section 31 of the premastering apparatus 10) is reduced. In particular, in the case of BD, since the mastering data is large capacity data, not having to store the mastering data for each group is advantageous.

Moreover, the disc manufactured is not in a special form such as BCA, and contains the group data GPD that is normal read-only data managed by the file system. Consequently, a read-only disc including group unique information with reproducing compatibility and general versatility is provided.

5. Second Example of Premastering Processing and Exposure Processing

A second example of the premastering processing and the exposure processing will be described with reference to FIG. 11 and FIG. 12, respectively.

Figure 11:
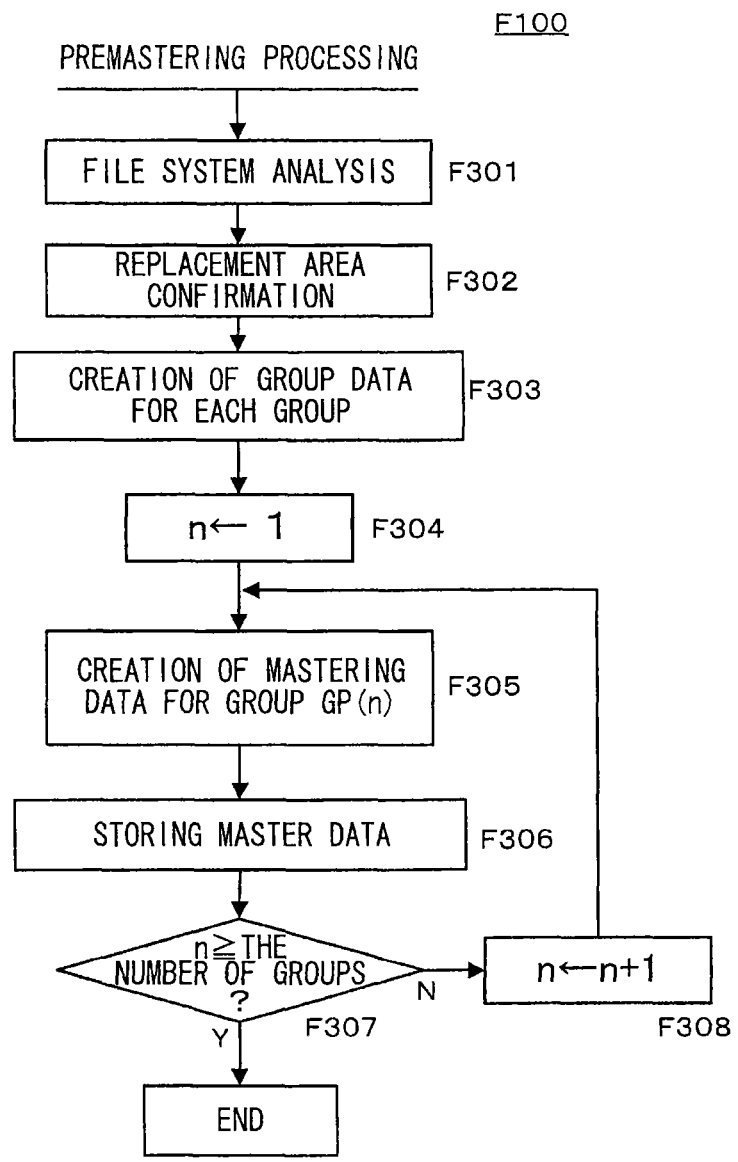
FIG. 11 is a flowchart of a second example of the premastering processing of the embodiment.
Figure 12:
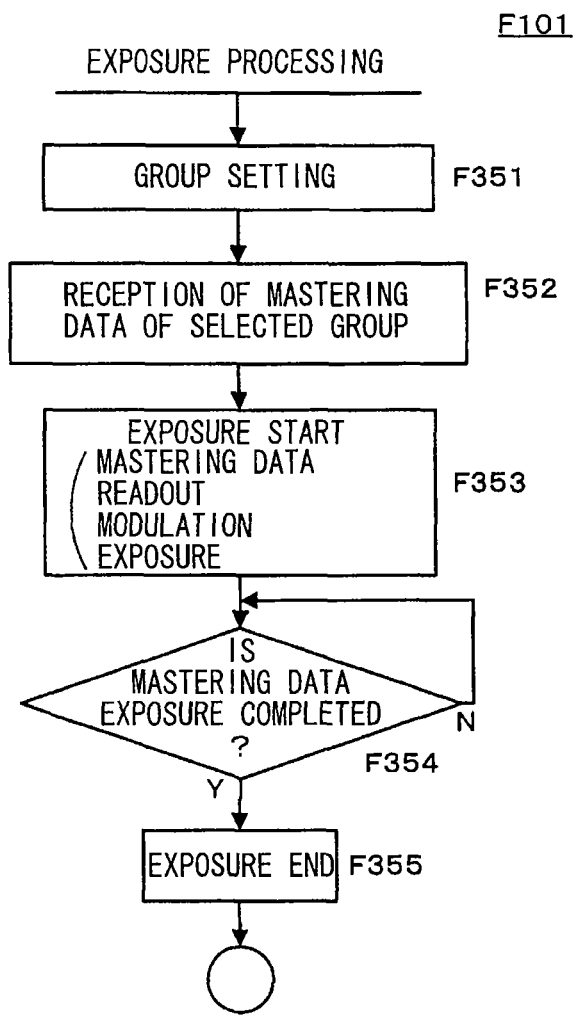
FIG. 12 is a flowchart of a second example of the exposure processing of the embodiment.

In the case of the second example, processing of FIG. 11 is executed as the premastering processing in the step F100 of FIG. 6. FIG. 11 illustrates processing executed by the calculation section 32 of the premastering apparatus 10 based on a program.

The calculation section 32 analyzes the file system in the cutting master as a step F301. Specifically, the calculation section 32 confirms the file system to figure out the data structure and the contents, in the cutting master that has been supplied through the authoring and has been stored in the memory section 31.

Then, the calculation section 32 confirms the replacement area based on the file system in a step F302. In other words, the calculation section 32 confirms the data position of the replacement area and the size of the replacement data.

Next, the calculation section 32 generates and prepares group data corresponding to each group in a step F303. Specifically, the calculation section 32 sets the group data GPD 1, GPD2, . . . for groups GP1, GP2, . . . , respectively, and stores the group data in the memory section 51.

After that, the mastering data MSD for each group is created.

First, in a step F304, the calculation section 32 sets a variable n=1 to create the mastering data MSD for a group GP(n) in a step F305. Therefore, the mastering data MSD1 for the group GP1 is firstly created. The mastering data MSD1 is data subjected to processing such as encryption processing of predetermined data of the cutting master and addition of signature data, and replacement of the data in the replacement area managed by the file system with the group data GPD1.

After the mastering data MSD1 for the group GP1 is created, the calculation section 32 stores the mastering data MSD1 in the memory section 31 in a step F306.

In the case where n is not equal to or larger than the number of groups in a step F307, namely, in the state where the mastering data MSD corresponding to all of the groups are not created, the processing in the steps F305 and F306 is repeated while the variable n is incremented in a step F308.

Accordingly, the mastering data MSD2, MSD3, . . . for the groups GP2, GP3, . . . are successively created in the above-described processing, and are stored in the memory section 31.

When the variable n is equal to or larger than the number of groups in the step F307, it is determined that the mastering data MSD1 to MSD(n) corresponding to all of the groups are created, and the premastering processing is ended.

In the premastering apparatus 10, the premastering processing is performed as described above. In other words, the mastering data MSD in which the different group data GPD different for each group is arranged is created for each group.

After that, the exposure processing in the step F101 of FIG. 6 is executed by the exposure apparatus 20. FIG. 12 illustrates the exposure processing executed by the exposure apparatus 20. FIG. 12 illustrates processing executed by the controller 40 of the exposure apparatus 20 based on a program.

First, the controller 40 performs group setting in a step F351. Specifically, the controller 40 sets which group's master disc is to be manufactured in the mastering to be performed.

The controller 40 selects and sets a specific group in the step F351, and then requests the mastering data MSD corresponding to the selected group from the premastering apparatus 10. The premastering apparatus 10 transmits the mastering data MSD corresponding to the demand to the exposure apparatus 20.

The exposure apparatus 20 stores the transmitted mastering data MSD in the mastering data memory section 51b of the memory section 51 in a step F352.

For example, in the case of manufacturing the master disc 100 for the group GP1, the controller 40 requests the mastering data MSD1 for the group GP1 from the premastering apparatus 10. Then, the mastering data MSD1 that has been transmitted in response thereto is stored in the memory section 51.

Note that, in the case of the processing as the second example, it is unnecessary to supply the group data GPD, the area information ARIFO of the replacement area, and the like from the premastering apparatus 10 to the exposure apparatus 20. This is because the mastering data MSD supplied to the exposure apparatus 20 is the data in which the data to be replaced (for example, dummy data) has been already replaced with the group data GPD.

The controller 40 receives the mastering data MSD, and then performs exposure starting control in a step F353.

The controller 40 instructs the writing/reading control section 52 to read out the mastering data MSD, and starts operation of each of the modulation section 41, the laser drive pulse generation section 42, the laser driver 41, and the exposure head 46. In addition, the controller 40 instructs the spindle servo/driver 47 and the slide driver 48 to perform rotational driving of the master disc.

As a result, the exposure on the master disc 100 based on the mastering data MSD is started.

After the exposure is started, the controller 40 monitors the exposure completion based on the mastering data MSD in a step F354, and terminates the exposure operation by each section at the exposure completion timing in a step F355.

The exposure processing is performed as described above, and the steps F102 and F103 of FIG. 6 are then performed. In the master disc produced in the step F102 and the stamper produced in the step F103, a pit array in a state where the data to be replaced that is added to the cutting master is replaced with the group data GPD is formed.

Thereafter, the optical disc is manufactured in the steps F104 to F106 of FIG. 6, and the optical disc is obviously an optical disc that has the data structure containing the group data GPD as illustrated in (c) of FIG. 2. In other words, the optical disc is an optical disc in which the read-only contents data and the group data GPD are managed by the file system.

According to the manufacturing method of the second example described above, it is possible to manufacture the master disc 100 containing the group data GPD unique to each group, of the read-only discs containing the same content, without performing the premastering and the authoring again, as in the above-described first example.

Since it is sufficient for the disc manufacturing steps for each group to perform only the mastering and the subsequent steps for each group, it is not necessary to perform again master data creation by authoring and premastering processing, and thus manufacturing efficiency in the case of manufacturing optical discs for a large number of groups is remarkably improved.

In other words, the manufacturing efficiency of the recording media with the same title containing different information between the groups is largely improved.

Note that, in the case of the second example, the mastering data is created individually for each group in the premastering processing. Therefore, this may necessitate relatively large capacity in, for example, the memory section 31 of the premastering apparatus 10.

Incidentally, on the other hand, on the exposure apparatus 20 side, since it is only necessary to perform the exposure based on the mastering data MSD that has been normally received, process load on the exposure apparatus 20 side is not generated. In other words, an advantage in terms of burden of equipment is achieved in which an existing exposure apparatus can be used as it is to perform the exposure step.

In addition, also in the case where the second example is employed, the disc to be manufactured is not in a special form such as BCA, and contains the group data GPD that is normal read-only data managed by the file system. Consequently, a read-only disc including group unique information with reproducing compatibility and general versatility is provided.

Note that, as a modification, there may also be a method in which a plurality of pieces of mastering data MSD corresponding to a plurality of groups created in the premastering apparatus 10 may be all transferred to the exposure apparatus 20 in advance and one piece of mastering data MSD may be selected on the exposure apparatus 20 side at the time of manufacturing a master disc to perform the exposure.

6. Folder and File in which Replacement Data is Recorded

Here, a specific example of the replacement area described with reference to FIG. 2 is illustrated.

Figure 13:
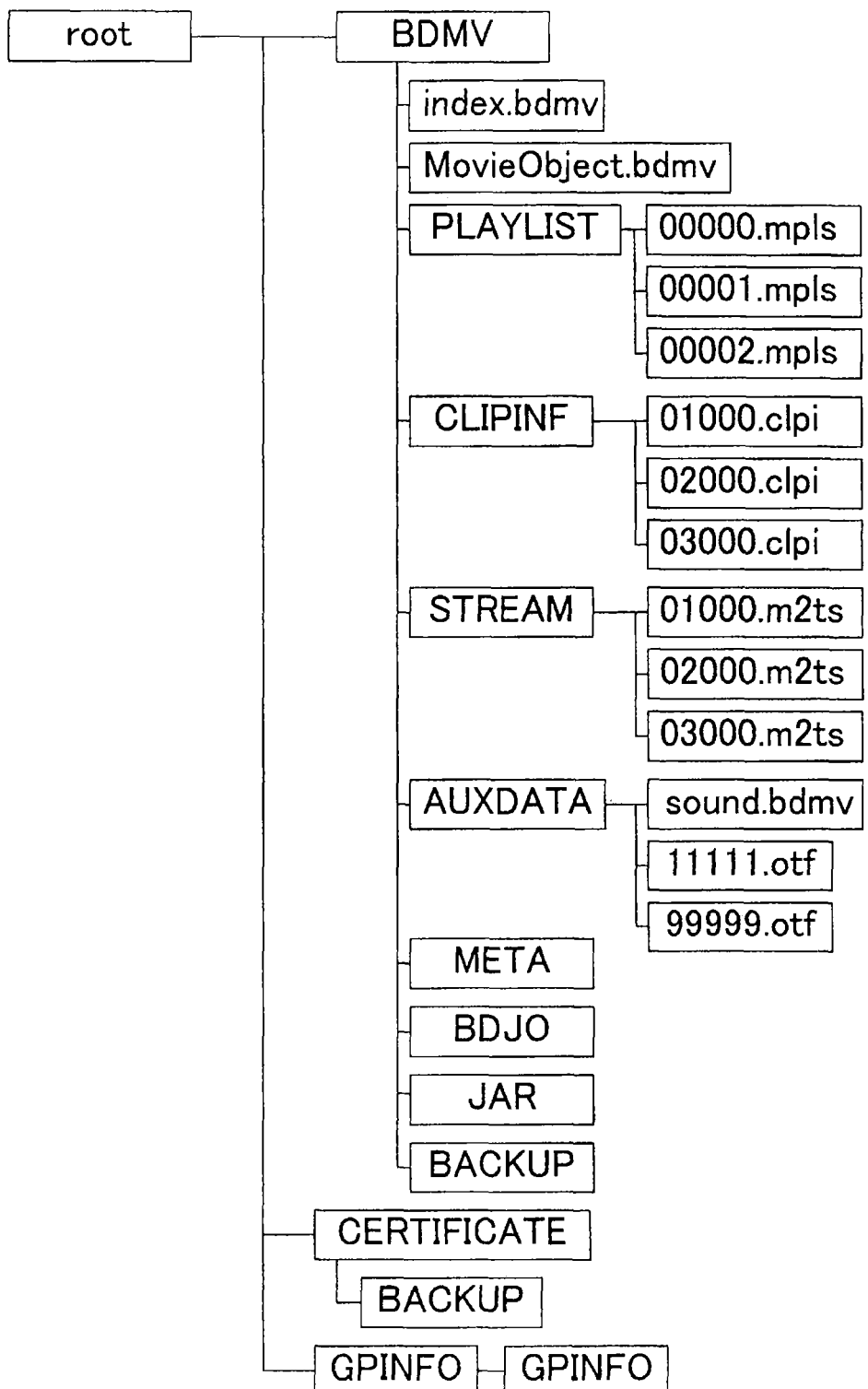
FIG. 13 is an explanatory diagram of an example of a folder in which replacement data is recorded, of the embodiment.

An example of the data structure that is passed on from the cutting master to the mastering data MSD and further to the optical disc finally manufactured is illustrated in FIG. 13. FIG. 13 illustrates a BD compliant directory structure.

A BDMV folder and a CERTIFICATE folder are disposed under root. Further, a GPINFO folder 90 is disposed.

The BDMV folder is a folder in which contents of a Blu-ray disc, management information thereof, and additional information thereof are arranged. As illustrated in the drawing, folders and files of "index.bdmv", "MovieObject.bdmv", "PLAYLIST", "CLIPINF", "STREAM", "AUXDATA", "META", "BDJO", "JAR", and "BACKUP" are disposed in the BDMV folder.

For example, playlist files such as "00000.mpls", "00001.mpls", and "00002.mpls" are arranged in the "PLAYLIST". These are files in which information for specifying reproduction of contents data is recorded.

Clip information files such as "01000.clpi", "02000.clpi", and "03000.clpi" are arranged in the "CLIPINF". These are files in which management information for managing stream files is recorded.

Stream files such as "01000.m2ts", "02000.m2ts", and "03000.m2ts" are arranged in the "STREAM". These are files in which stream data is recorded.

In such a data structure, for example, the GPINFO folder 90 directly under the root is handled as the replacement area of (a) of FIG. 2.

Specifically, in the phase of the cutting master produced by authoring, a GPINFO file 91 is provided in the GPINFO folder 90, and for example, dummy data is disposed therein.

At the time of the exposure illustrated as the first example and the second example described above, the data in the GPINFO file 91 is replaced with the group data GPD.

The optical disc as a finished product manages the directory structure of FIG. 13 by the file system. Therefore, the group data GPD is read out as the GPINFO file 91 in the GPINFO folder 90 based on the file system.

Next, FIG. 14 illustrates an example in which a part of a file is handled as a replacement area.

FIG. 14 illustrates a structure example of the "index.bdmv" arranged in the BDMV folder in the directory structure of FIG. 13 described above, for example.

In the "index.bdmv" file, a type indicator, a version number, index information, and the like are described.

Here, for example, a "GPinfo" region 91 is set as a region of 128 bits (16 bytes). The "GPinfo" region 91 of 16 bytes is handled as the replacement area of (a) of FIG. 2.

Specifically, in the phase of the cutting master produced by the authoring, for example, dummy data is arranged as the replacement data in the "GPinfo" region 91 in the "index.bdmv" file. Then, at the time of the exposure illustrated as the first example and the second example described above, the data in the "GPinfo" region 91 is replaced with the group data GPD.

Since the optical disc as a finished product manages the directory structure of FIG. 13 by the file system, when the "index.bdmv" file is read out based on the file system, the group data GPD recorded in the "GPinfo" region 91 is read out.

Note that each example described above is merely an example. In the case of Blu-ray disc compliant directory structure, it is obviously conceivable that the replacement area may be prepared in a folder or a file other than that of the example described above, and the group data GPD may be arranged therein.

In addition, the present disclosure is applicable to optical discs having a file system such as DVD-ROM and CD-ROM, other than the optical disc of BD scheme. Therefore, it is also obviously conceivable that the replacement area may be set in a file or a folder in the directory structure of DVD scheme.

Moreover, the present disclosure is applicable to a recording medium that is other kinds of recording medium such as an optical card and employs a data structure having a file system, in addition to the optical discs.

7. Program

The programs of the embodiment are programs that cause the processing of the premastering apparatus 10 and/or the exposure apparatus 20 to be executed.

Specifically, one of the programs of the embodiment is a program that causes the calculation section 32 of the premastering apparatus 10 to execute the processing illustrated in FIG. 9 as the above-described first example.

The program causes an information processor (the calculation section 32) to execute the steps of confirming the data to be replaced based on the file system and preparing the replacement data to be replaced with the data to be replaced, for the master data (cutting master) having the data structure in which the contents data and the data to be replaced are managed by the file system, as master data used in manufacturing of the master disc 100.

In addition, the program of the embodiment includes a program that causes the controller 40 of the exposure apparatus 20 to execute the processing illustrated in FIG. 10 of the above-described first example.

The program is a program that causes the processing of the control section (the controller 40) of the exposure apparatus 20 that is supplied with the replacement data (the group data GPD) and the master data (the mastering data MSD) containing the data to be replaced and thus performs exposure of the master disc 100, to be executed. The program causes the control section to execute control of performing exposure by the laser light irradiation based on the modulation signal obtained from the modulation processing of the master data, and performing the replacement processing in which the data to be replaced in the master data used for the modulation processing is replaced with the replacement data.

Moreover, the program of the embodiment includes a program that causes the calculation section 32 of the premastering apparatus 10 to execute the processing illustrated in FIG. 11 of the above-described second example.

The program causes the information processor (the calculation section 32) to execute the steps of confirming the data to be replaced based on the file system and preparing the replacement data (the group data GPD) to be replaced with the data to be replaced, for the master data (the cutting master) having the data structure in which the contents data and the data to be replaced are managed by the file system, as the master data used in manufacturing of the master disc 100. Further, the program may cause the information processor (the calculation section 32) to execute the step of creating the master data (the mastering data MSD) in which the data to be replaced is replaced with the replacement data.

It is possible to realize, for example, the premastering apparatus 10 using a personal computer by such programs. In addition, the controller 40 of the exposure apparatus 20 is easily realized.

Such programs may be recorded in advance in a HDD as a recording medium provided in an apparatus such as a personal computer, or a ROM, a flash memory, or the like in a microcomputer having a CPU.

Alternatively, such programs may be stored (recorded) temporarily or permanently in removable recording media such as a flexible disc, a CD-ROM (Compact Disc Read Only Memory), an MO (Magnet optical) disc, a DVD, a Blu-ray disc, a magnetic disc, a semiconductor memory, and a memory card. Such removable recording media may be provided as so-called package software.

Moreover, the programs may be downloaded from download sites through network such as LAN (Local Area Network) and the Internet, in addition to installment from the removable recording medium to a personal computer.

The invention claimed is:

1. A method of manufacturing a recording medium master disc, the method comprising:
    performing preprocessing, for master data having a data structure in which contents data and data to be replaced are managed by a file system, by confirming the data to be replaced based on the file system and by preparing different groups of replacement data to replace the data to be replaced prior to exposure of the recording medium master disc, each of the different groups of replacement data being recordable on a recording medium, different from the recording medium master disc, along with the contents data;
    performing exposure of the recording medium master disc, based on the master data in which the data to be replaced is replaced with one of the different groups of replacement data; and
    performing development on the recording medium master disc subjected to the exposure to produce the recording medium master disc on which a concavo-convex pattern corresponding to the exposure is formed.

2. The method of manufacturing the master disc according to claim 1, wherein in said performing exposure, the different groups of replacement data and the master data containing the data to be replaced are supplied, the exposure is performed by laser light irradiation based on a modulation signal obtained from modulation processing of the master data, and replacement processing in which the data to be replaced in the master data used for the modulation processing is replaced with the one of the different groups of replacement data is performed.

3. The method of manufacturing the master disc according to claim 1, wherein in said performing preprocessing, the master data in which the data to be replaced is replaced with the one of the different groups of replacement data is created, and
in said performing exposure, the exposure is performed by laser irradiation, based on a modulation signal obtained from modulation processing of the master data subjected to replacement.

4. The method of manufacturing the master disc according to claim 1, further comprising, creating the master data used in said performing preprocessing, the master data having the data structure in which the contents data and the data to be replaced are managed by the file system.

5. The method of manufacturing the master disc according to claim 4, wherein in said creating the master data having the data structure managed by the file system, the data to be replaced is data arranged in a specific folder or in a specific file.

6. A method of manufacturing a recording medium, the method comprising:
    performing preprocessing, for master data having a data structure in which contents data and data to be replaced are managed by a file system, by confirming the data to be replaced based on the file system and by preparing a plurality of pieces of replacement data that are different for replacing the data to be replaced prior to exposure of a recording medium master disc, different from said recording medium, and for said recording medium to be manufactured on a group basis, each of the plurality of pieces of replacement data being recordable on said recording medium along with the contents data;
    performing exposure of the recording medium master disc, based on the master data in which the data to be replaced is replaced with one of the plurality of replacement data selected according to a group of said recording medium to be manufactured;
    performing development on the recording medium master disc subjected to the exposure to produce the recording medium master disc on which a concavo-convex pattern according to the exposure is formed;
    providing a stamper by using the recording medium master disc produced in said performing development; and
    producing a recording medium substrate by using the stamper and forming, on the recording medium substrate, a layer structure including a recording layer to produce said recording medium.

7. A non-transitory computer-readable storage medium storing computer-readable instructions, that when executed by a computer, causes the computer to execute a method comprising:
    confirming, for master data having a data structure in which contents data and data to be replaced are managed by a file system as master data used in manufacturing of a recording medium master disc, the data to be replaced based on the file system; and
    preparing, prior to exposure of the recording medium master disc, different groups of replacement data that is to be replaced with the data to be replaced, each of the different groups of replacement data being recordable on a recording medium, different from the recording medium master disc, along with the contents data.

8. The non-transitory computer-readable storage medium according to claim 7 causing the computer to execute the method further comprising creating the master data in which the data to be replaced is replaced with one of the different groups of replacement data.

9. A non-transitory computer-readable storage medium storing computer-readable instructions, that when executed by a computer, causes the computer to execute a method comprising:

processing of a control section of an exposure apparatus supplied with different groups of replacement data and master data containing contents data and data to be replaced, the different groups of replacement data being received to replace the data to be replaced prior to exposure of a recording medium master disc and each of the different groups of replacement data being recordable on a recording medium, different from the recording medium master disc, along with the contents data;

performing exposure of the recording medium master disc to be execute;

causing the control section to execute control of performing the exposure by laser light irradiation based on a modulation signal obtained from modulation processing of the master data; and performing replacement processing in which the data to be replaced in the master data used in the modulation processing is replaced with one of the different groups of replacement data.

10. A non-transitory computer-readable recording medium having a data structure managed by a file system, the recording medium being recorded with contents data, and a plurality of pieces replacement data that are arranged at a data position in a specific folder or in a specific file, wherein one of the plurality of pieces of replacement data is recorded in the data position of the data structure at which data to be replaced is formerly arranged upon manufacturing of the recording medium, and the plurality of pieces of replacement data are prepared to replace the data to be replaced prior to being recorded on the recording medium and each the plurality of pieces of replacement data is recordable on the recording medium along with contents data.

11. The recording medium according to claim 10, wherein the different groups of replacement data are data indicating information unique to the recording medium to be manufactured on a group basis.

12. The recording medium according to claim 11, wherein different groups of replacement data that are read-only are recorded by being manufactured through:

performing preprocessing, for master data having a data structure in which the contents data and the data to be replaced are managed by a file system, by confirming the data to be replaced based on the file system and by preparing the plurality of pieces of replacement data that are different for the recording medium to be manufactured on the group basis;

performing exposure of the recording medium master disc, based on the master data in which the data to be replaced is replaced with the one of the plurality of pieces of replacement data selected according to a group of said recording medium to be manufactured;

performing development on the recording medium master disc subjected to the exposure to produce the recording medium master disc on which a concavo-convex pattern according to the exposure is formed;

providing a stamper by using the recording medium master disc produced in said performing development; and producing a recording medium substrate by using the stamper and forming, on the recording medium substrate, a layer structure including a recording layer to produce said recording medium.

13. The method of manufacturing the master disc according to claim 1, further comprising:

generating a group data table including the different groups of replacement data; and receiving information on a replacement area of the data to be replaced.

14. The method of manufacturing the master disc according to claim 13, further comprising, during said exposure of the recording medium master disc, monitoring whether a data position of the master data has reached the replacement area.

15. The method of manufacturing the master disc according to claim 14, further comprising, when the data position of the master data has reached the replacement area, reading the group data table and selecting the one of the different groups of replacement data from the group data table to replace the data to be replaced.

16. The method of manufacturing the master disc according to claim 1, wherein the different groups of replacement data include at least one of a group according to sales destination, a group according to vendor, a group according to manufacturing line, and a group according to usage.

17. The method of manufacturing the master disc according to claim 4, wherein the different groups of replacement data are unique to each group, and each of the different groups of replacement data is recordable on the recording medium without repeating said creating the master data.

* * * * *